United States Patent [19]

Haskell

[11] Patent Number: 4,476,484
[45] Date of Patent: Oct. 9, 1984

[54] TECHNIQUE FOR PROVIDING COMPATIBILITY BETWEEN HIGH-DEFINITION AND CONVENTIONAL COLOR TELEVISION

[75] Inventor: Barin G. Haskell, Tinton Falls, N.J.

[73] Assignee: AT&T Bell Laboratories, Murray Hill, N.J.

[21] Appl. No.: 391,973

[22] Filed: Jun. 24, 1982

[51] Int. Cl.³ .......................................... H04N 9/42
[52] U.S. Cl. ...................................... 358/11; 358/16
[58] Field of Search .................. 358/11, 12, 141, 142, 358/16

[56] References Cited

U.S. PATENT DOCUMENTS

| | | | |
|---|---|---|---|
| 2,686,831 | 8/1954 | Dome | 178/6.8 |
| 3,617,626 | 11/1971 | Bluth et al. | 178/6.6 A |
| 4,296,431 | 10/1981 | Holland | 358/12 |
| 4,300,161 | 11/1981 | Haskell | 358/142 |

OTHER PUBLICATIONS

Fujio, T., "A Study of HDTV Systems in the Future," IEEE Transactions on Broadcasting, vol. BC-24, No. 4, 12/78, pp. 92-100.
Ishida, T., et al, "Present Situations of Japanese Satellite Broadcasting for Experimental Purpose", IEEE Trans. on Broadcasting, vol. BC-25, No. 4, 12/79, pp. 105-112.
Fujio, T., "A Universal Weighted Power Function of TV Noise and its Appl. to HDTV System Design", IEEE Trans. on Broadcasting, vol. BC-26, No. 2, 6/80, pp. 39-47.
Asatani, K., et al, "Fibre Optic Analogue Transmission Experiment for HDTV Signals Using Semiconductor Laser Diodes," Electronic Letters, vol. 16, No. 14, Jul. 1980, pp. 536-538.
Fink, D. G., "The Future of HDTV: First Portion of the SMPTE Study on High-Definition Television", SMPTE, vol. 89, No. 2, pp. 89-94.
Fink, D. G., "The Future of HDTV: Conclusion of a Report of the Study Group on HDTV", SMPTE Journal, vol. 89, No. 3, 3/80, pp. 153-161.
Wendland, B., "Concepts for a Compatible HJFI TV System", NTG Fachber, vol. 74, Sep. 30-Oct. 3, 1980, pp. 407-416.
Hayashi, K., "Research and Development on HDTV in Japan", SMPTE Journal, vol. 90, No. 3, Mar. 1981, pp. 178-186.
Haskell, B. G., "Time-Frequency Multiplexing (TFM) of Two NTSC Color TV Signals-Simulation Results", BSTJ, vol. 60, No. 5, May-Jun., 1981, pp. 643-660.
Eng, K. Y., "Time Compression Multiplexing of Multiple Television Signals in Satellite Channels Using Chirp Transform Processors", IEEE Trans. on Comm., vol. COM-29, No. 12.
Fujio, T., et al., "HDTV System-Signal Standard and Transmission", SMPTE Journal, vol. 89, No. 8, Aug. 1980, pp. 579-584.
Fujio, T., et al., "HDTV System-Signal Standard and Transmission", IBC 80, Brighton, U.K., Sep. 1980, pp. 14-18.
Fujio, T., "HD Wide-Screen TV System for the Future", IEEE Transactions on Broadcasting, vol. BC-26, No. 4, Dec. 1980, pp. 113-124.

Primary Examiner—John C. Martin
Assistant Examiner—E. A. McDowell
Attorney, Agent, or Firm—Erwin W. Pfeifle

[57] ABSTRACT

The present invention relates to a compatible high-definition television (CHDTV) color picture signal which is capable of conversion by simple and inexpensive means into either a HDTV composite color picture signal for use by a HDTV receiver or an associated conventional television system (ACTS) color picture signal for use by an ACTS receiver. The present CHDTV color picture signal comprises (a) a first line scan rate which is the same as that of the ACTS signal, (b) a first line signal of a HDTV camera signal produced at a second line scan rate which is time stretched and transmitted as is at the first line scan rate in a first portion of the CHDTV signal bandwidth, and (c) a second line signal of the HDTV camera signal which is time streched and transmitted as a line differential signal on a vestigial sideband carrier signal in a second portion of the HDTV signal bandwidth.

18 Claims, 12 Drawing Figures

TECHNIQUE FOR PROVIDING COMPATIBILITY BETWEEN HIGH-DEFINITION AND CONVENTIONAL COLOR TELEVISION

BACKGROUND OF THE INVENTION

1. Field of the Invention

The present invention relates to a technique for providing compatibility between high-definition color television (HDTV) and present day conventional color television. More particularly, the present invention relates to a technique which provides a television signal which is capable of being converted by simple and inexpensive means into either a high-definition TV picture signal for use by a HDTV receiver or a conventional standard picture signal for use in present day receivers such as, for example, a National Television System Committee (NTSC), Phase Alternation Line (PAL) or SECAM system signal.

2. Description of the Prior Art

Present day conventional television using, for example, NTSC or PAL system signals provide fairly good color pictures if the receiving conditions are good. Such pictures, however, do not come close to having the sharpness, realism and visual impact as might be found, for example, in a motion picture film or a magazine quality picture. To provide dramatically better television picture quality, experimental studies have been performed and components have been developed in an attempt to provide High-Definition Television (HDTV) pictures which approach the quality of a 35 mm color film. Such high resolution TV has been deemed especially advantageous for use, for example, in wide screen theater and home TV projection and for theatrical motion picture production and projection using magnetic tape instead of film.

Several HDTV systems have already been proposed, the parameters of which are generally disclosed in the article "The Future of High-Definition Television: First Portion of a Report of the SMPTE Study Group on High-Definition Television" by D. G. Fink in *SMPTE Journal,* Vol. 89, No. 2, February 1980 at pp. 89–94 and its conclusion in Vol. 89, No. 3, March 1980 at pp. 153–161. In the systems disclosed therein, the lines per frame range from 1023 to 2125, the aspect ratios (picture width to picture height) range from 4:3 to 8:3 and luminance bandwidths range from 20 to 50 MHz. The recommendation of this group was that a HDTV signal should be capable of a standards conversion that would provide service to NTSC, PAL and SECAM domestic services. After three years of study, however, this group concluded that a HDTV system compatible with the existing domestic services is not feasible by any means known to or envisaged by the Study Group, in view of HDTV aspect ratios and bandwidths. They furter concluded that adoption of a non-compatible HDTV system for home use is problematical and would occur only after prolonged exposure to the public of HDTV projected images in theaters.

A description of one of the systems considered by the SMPTE Study Group is found in the articles "High-Definition Television System-Signal Standard and Transmission" by T. Fujio et al in *SMPTE Journal,* Vol. 89, No. 8, August 1980 at pp. 579–584 and "Research and Development on High-Definition Television in Japan" by K. Hayashi in *SMPTE Journal,* Vol. 90, No. 3, March 1981 at pp. 178–186. These articles discuss the 1125 scan line, 5:3 aspect ratio, 20 MHz luminance bandwidth system being developed in Japan. Compatibility with conventional receivers is not discussed or considered.

Other techniques labeled as either high-definition or high-resolution television systems have modified the transmission of the conventional TV signal to, for example, provide increased horizontal line resolution or better luminance resolution with less objectionable subcarrier pattern. In this regard see, for example, U.S. Pat. No. 2,686,831 issued to R. B. Dome on Aug. 17, 1954 where large area flicker is allegedly canceled by subdividing the TV picture signal into three contiguous bands and transmitting each of the three bands in a certain manner during the normal sequence of a conventional picture signal. See also U.S. Pat. No. 4,296,431 issued to K. F. Holland on Oct. 20, 1981, wherein the picture signal has one of the color axes inverted at a first rate while the second color axis is inverted at a second, different, rate to provide better luminance resolution and better subcarrier pattern than allegedly found with the normal conventional signal.

Another technique for improving the horizontal and vertical definition and reducing low frequency flicker in a conventional picture is disclosed in the article "Concepts For A Compatible HIFI-Television System" by B. Wendland in *NTG-Fachber* (Germany), Vol. 74, September, 1980, at pp. 407–416. There is disclosed an arrangement wherein the picture quality can allegedly be improved using digital signal processing technologies. Offset sampling is used to improve horizontal definition, and a double rate stored image readout at the receiver selects the appropriate signal portions to subjectively increase the vertical definition and reduce low frequency (25 Hz) flicker. The latter three references, however, are only attempts to improve conventional television receiver picture quality and do not provide resolution comparable to a 35 mm film or magazine quality picture.

An important aspect of introducing any new service is its degree of compatibility with existing serrvices. For example, color TV was implemented having full compatibility with the then existing monochrome TV standard. Therefore, the problem remaining in the prior art is to provide methods and apparatus for transmitting a television picture signal which can be made compatible for use by either a NTSC, PAL or SECAM system receiver to produce a conventional TV picture or a high-definition television receiver to produce a picture approaching that of a 35 mm film.

SUMMARY OF THE INVENTION

The foregoing problem has been solved in accordance with the present invention which relates to a technique for providing compatibility between high-definition color television (HDTV) and present day conventional color television. More particularly, the present invention relates to a technique which provides a television signal which is capable of being converted by simple and inexpensive means into either a high-definition TV picture signal for use by a HDTV receiver or a conventional standard picture signal for use in present day receivers such as, for example, a National Television System Committee (NTSC), Phase Alternation Line (PAL) or SECAM system signal.

In accordance with the present invention, a compatible high-definition television (CHDTV) color picture signal is generated which is capable of being converted by simple and inexpensive means into either one of a HDTV composite signal or an associated conventional TV signal. The CHDTV color picture signal is formed in one embodiment by first generating a HDTV composite picture signal comprising a scaled up version of the associated conventional system color picture signal including a luminance bandwidth capable of providing a number of picture lines and a line scan rate which is a predetermined multiple of the number of picture lines and line scan rate of the associated conventional system color picture signal, a frame and a field rate which is the same as that of the associated conventional system picture signal, and chrominance information which is formed on sidebands of a separate color subcarrier within the luminance bandwidth, which subcarrier is a fixed multiple of the line scan rate of the associated conventional system picture signal and includes a ratio of each of the chroma component bandwidths to the luminance bandwidth which is similar to that of the associated conventional system picture signal. The HDTV composite picture signal is then transformed into the CHDTV color picture signal including a line scan rate which is the same as the associated conventional system picture signal format by sending information associated with a predetermined multiple of lines in one segment by stretching each HDTV composite line signal in time by a factor corresponding to the predetermined multiple and forming a first line signal as is within a predetermined luminance bandwidth which is a predetermined submultiple of the luminance bandwidth of the HDTV composite signal, and forming a second line signal as a line-differential signal on a vestigial sideband carrier (VSB) signal which is separated from the color subcarrier of the first line signal by a frequency equal to that of the baseband color subcarrier frequency of the associated conventional television system picture signal. Additional signals can be formed as line-difference signals on vestigial sideband carriers above the aforementioned VSB carrier.

It is an aspect of the present invention to provide circuitry for converting the CHDTV color picture signal into either one of a HDTV composite signal for use in HDTV receivers or a conventional TV picture signal for use with present day TV receivers, where the conventional picture signal can have the form of either one of a NTSC, PAL or SECAM system signal.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 1:
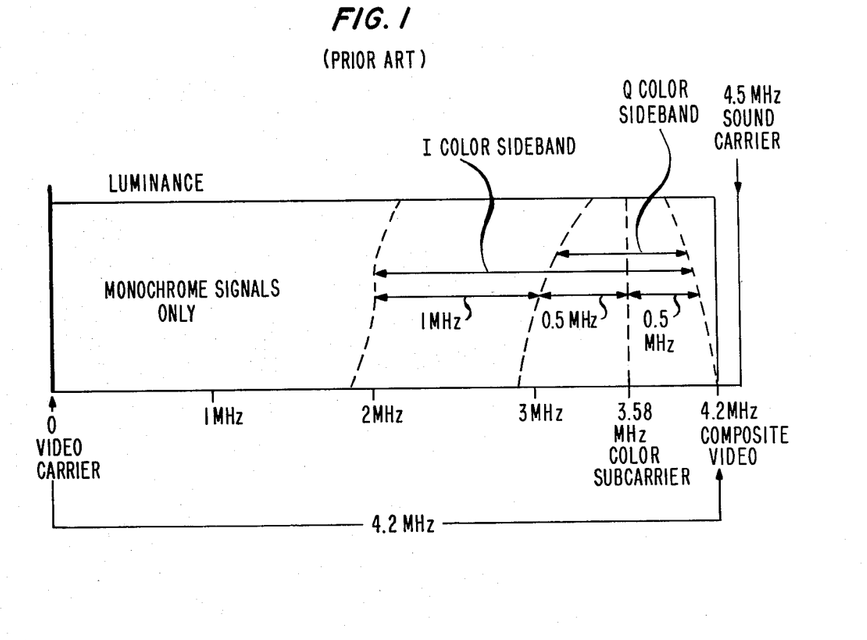
FIG. 1 illustrates the frequency spectrum for a National Television System Committee (NTSC) system baseband signal.

FIG. 1 illustrates a National Television System Committee (NTSC) signal which has a usable baseband spectrum that extends from 0 to 4.5 MHz between the 0 MHz video carrier and the 4.5 MHz sound carrier. The signal comprises a luminance signal (Y) formed over a 4.2 MHz band to provide the monochrome picture information relating to the picture component brightness, and chrominance signal information comprising I and Q chroma components which are frequency interleaved with the luminance signal about a 3.579545 MHz color subcarrier to provide the color information. The picture signal provides 525 lines/frame interlaced two to one, an aspect ratio of 4:3, a horizontal scanning frwquency $f_H \approx 15{,}734$ Hz for color. Such a signal is well known in the art.

The high-definition television (HDTV) systems proposed thus far for providing a picture having the definition approaching a 35 mm film have included line/frame, aspect ratios and luminance bandwidths which are not particularly amenable to easy conversion to the NTSC, PAL or SECAM system signal and, in turn, for use by conventional receivers. In order to achieve compatibility with, for example, NTSC, three choices are possible. First, a signal completely compatible with NTSC, yet convertible to HDTV, could be formed, but such a signal would provide rather poor HDTV picture quality. Second, the output from the HDTV camera could be transmitted directly and converters provided for NTSC, which converters have in the past been found to be very large and expensive. Lastly, and in accordance with the present invention, a signal is constructed which requires conversion both for NTSC and HDTV reception, which has been found to be achievable by simple and inexpensive circuitry.

In accordance with a preferred embodiment of the present invention, for HDTV camera scanning there is used, for simplicity of explanation only and not for purposes of limitation, 1050 lines per frame which is twice that of NTSC, 2:1 interlace and a line-scan rate $F_H$ exactly twice that of NTSC, i.e., $$F_H \triangleq (4/455) \times 3579545 \approx 31468 \text{ Hz.} \quad (1)$$

The frame and field rates are exactly the same as NTSC, while the luminance bandwidth is chosen to be $$B_L = 15.2 \text{ MHz.} \quad (2)$$

Displaying 1050 lines per frame is near optimum for a viewing distance of about 3.5 times picture height. The bandwidth $B_L$ corresponds to a Kell factor of approximately 0.55, which is somewhat less than the NTSC Kell factor of approximately 0.66. However, this choice of bandwidth allows for simple transmission of stereo audio. The Kell factor could be increased, if need be, by the use of spatiotemporal filtering at the HDTV camera. This would also have the wide benefit of reducing aliasing distortions in the converted NTSC pictures.

Figure 2:
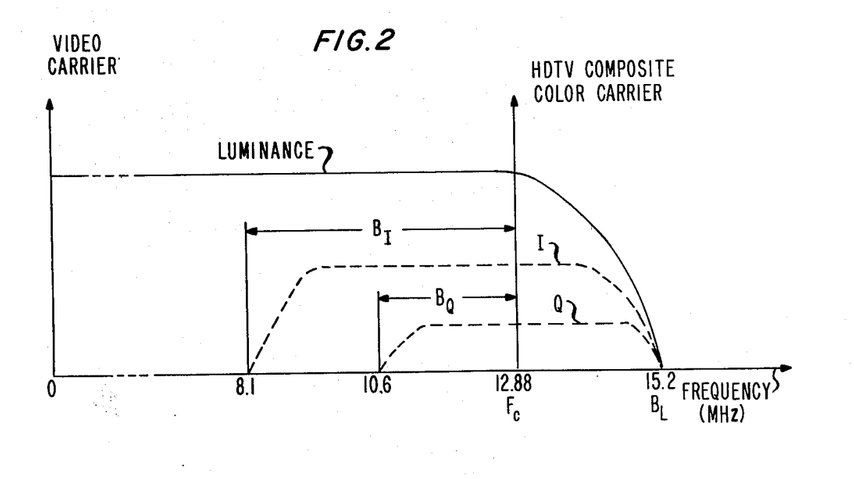
FIG. 2 illustrates the frequency spectrum for a high-definition television (HDTV) composite baseband signal in accordance with the present invention where, for simplicity, the line scan rate is twice that of the associated conventional TV signal.

In the HDTV composite signal shown in FIG. 2, chrominance information is combined with luminance information in the same manner as in NTSC, i.e., quadrature AM modulated onto a color subcarrier. A color subcarrier frequency is chosen which is an odd multiple of one-half the line scan rate in order to achieve the well known chrominance/luminance frequency interleaving. Specifically, as shown in FIG. 2, for the HDTV composite signal, $$F_c \triangleq (819/2) F_H \triangleq (18/5) \times 3579545 \approx 12.88 \text{ MHz.} \quad (3)$$

The bandwidths of the I and Q chrominance components in accordance with a preferred embodiment of the present invention are, respectively, $$B_I = 4.8 \text{ MHz}$$

$$B_Q = 2.3 \text{ MHz} \quad (4)$$

which are somewhat different in proportion to $B_L$ than they are in the NTSC system. However, the difference is small, and if need be $B_I$ could be increased at the expense of circuit complexity. Recent subjective tests indicate that the bandwidths of equation (4) should be adequate.

Figure 3:
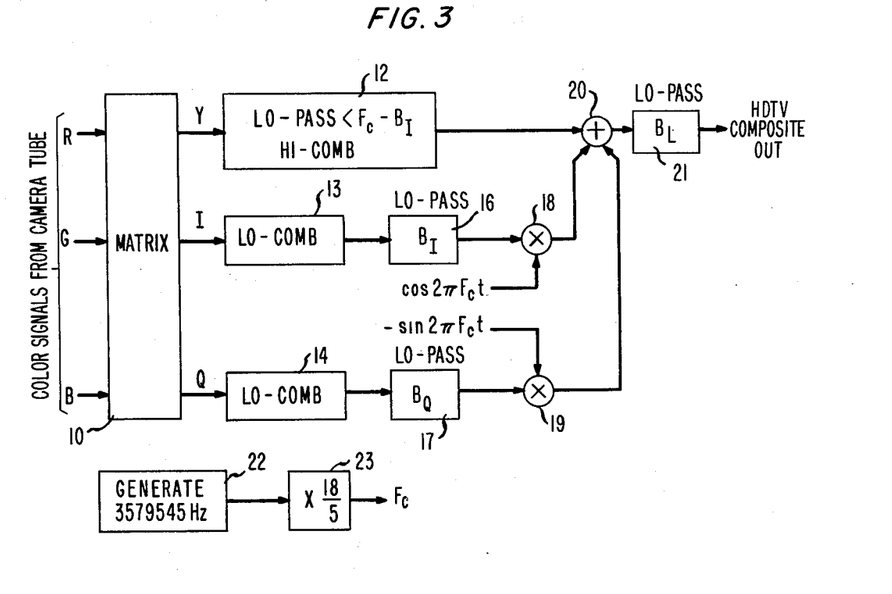
FIG. 3 is a block diagram of a system for generating a HDTV composite video signal of FIG. 2 from the red, blue and green HDTV camera tube outputs.

The spectrum of the resulting composite HDTV signal which would presumably be produced by the camera is shown diagrammatically in FIG. 2. The Q signal is double sideband (DSB), and the I signal is vestigial sideband (VSB) as in the NTSC system. FIG. 3 shows an exemplary system for use with 3-tube color cameras for generating the signal of FIG. 2 which signal is essentially a frequency scaled-up version of the present NTSC signal. With other than 3-tube cameras, the operations are an obvious extension of FIG. 3.

In FIG. 3, the red, green and blue signals (R,G,B) come directly from the camera tubes at line-rate $F_H$ and are passed to a well-known type matrixing circuit 10 which forms the luminance and two chrominance signals Y, I and Q. The Y, I and Q signals then pass through comb filters 12, 13 and 14, respectively, which remove frequency components occuring at odd harmonics of half the line-rate. For the I and Q signals, all such harmonics are removed. For Y signal only, the harmonics above $F_c = B_I \approx 8.1$ MHz are removed.

The chrominance signals I and Q are then low-pass filtered to provide the desired bandwidths $B_I$ and $B_Q$, respectively, by respective filters 16 and 17. Following this, the I and Q signals are quadrature modulated onto the color subcarrier by modulators 18 and 19, respectively, and then added to the luminance signals by adder 20. Finally the composite HDTV signal is low-pass filtered by filter 21 to the proper bandwidth $B_L$. The color subcarrier frequency $F_c$ is shown in FIG. 3 as being provided by a generator 22 which generates the color subcarrier frequency used in the NTSC system which output signal is then transformed to the proper color subcarrier frequency for providing the HDTV composite signal by circuitry 23 which multiplies the output signal from generator 2 by, for example, 18/5 to provide the proper harmonic for the color subcarrier frequency. As in NTSC, a short reference burst of color subcarrier is assumed to be placed somewhere in the composite HDTV signal, e.g., in the horizontal retrace period. Gamma correction is not shown in FIG. 3, but such correction is usually done at the input to matrix circuit 10, and it is to be understood that any other correction method can be used, which correction method does not form a part of the present invention.

Figure 4:
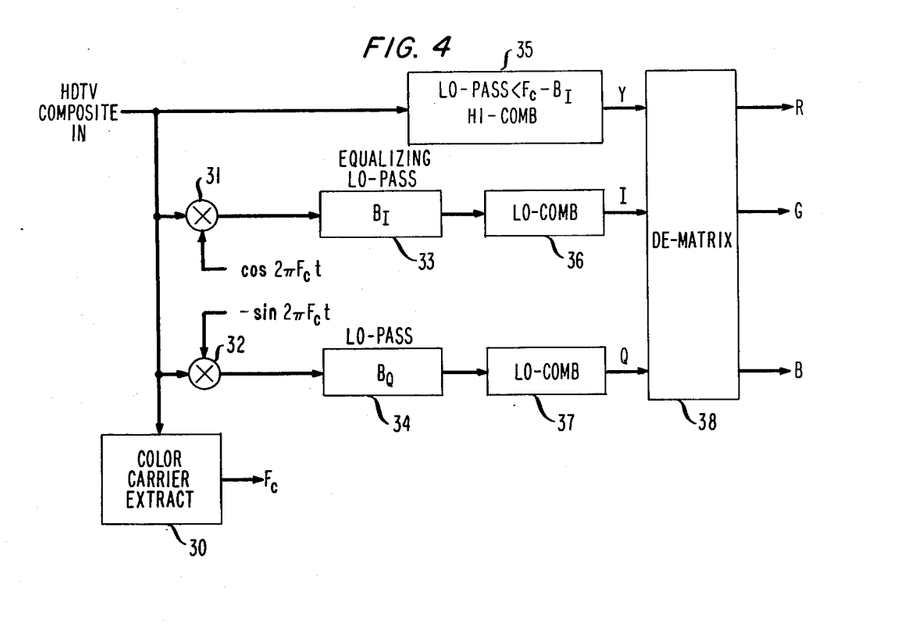
FIG. 4 is a block diagram of a system for transforming the HDTV composite video signal of FIG. 2 into the Red, Green and Blue components for display on a HDTV receiver.

Conversion from the composite HDTV signal of FIG. 2 back into the red, blue and green (R,B,G) signals is, again, a frequency scaled-up version of the NTSC system method and is shown in FIG. 4. Such arrangement is an inverse arrangement to that shown in FIG. 3. In FIG. 4, the color subcarrier, $F_c$, is obtained, for example, from a burst, comprising, for example, a 33 degree phase shift as in NTSC, in the horizontal blanking period in the HDTV composite signal by a color carrier extraction means 30. The color subcarrier $F_c$ is then used by demodulators 31 and 32 to quadrature demodulate the I and Q chrominance signals, respectively, from the HDTV composite signal. The resultant I signal from modulator 31 is passed through an equalizing filter 33 which amplifies all frequency components above the Q signal bandwidth $B_Q$ and below the I signal bandwidth $B_I$ by, for example, 6 dB to compensate for the vestigial sideband (VSB) modulation of the I signal. This filtering could also have been performed in filter 16 of FIG. 3 during the formation of the HDTV composite signal.

The Q signal from modulator 32 is low-pass filtered by filter 34 to provide the desired bandwidth $B_Q$. The Y, I and Q signals are then comb filtered in filters 35, 36, and 37, respectively, as in FIG. 3 and dematrixed by, for example, a resistive matrix network in dematrix means 38 to obtain the desired R, B, and G signals. Alternatively, the two low-pass comb filters 36 and 37 could be replaced by a single bandpass filter disposed before multipliers 31 and 32 and the color carrier extraction means 30.

Most HDTV systems envisaged so far have a picture aspect ratio significantly larger than the 4:3 of NTSC. This is very desirable since most TV scenes benefit more from additional width than from additional height. In fact, recent tests reveal that for display sizes up to about 0.8 m$^2$, subjects prefer a 5:3 aspect ratio over wider or narrower pictures. In an attempt to accommodate this need, a signal can be formed which, after conversion to NTSC, produces a picture with aspect ratio 4.3:3. This means that objects and people in the NTSC picture will appear 7 percent skinnier than they really are. For those few viewers who are bothered by this, a simple adjustment of picture height can rectify the situation. The present signal can also provide a reduction in HDTV horizontal blanking time of 9 percent of a line period as compared with NTSC. This results in an overall HDTV aspect ratio of 4.7:3 which is reasonably close to optimum and represents a 17 percent increase in picture width as compared with NTSC. A larger aspect ratio might be achievable, depending on how willing people are to put up with distorted dimensions or to adjust picture height on their conventional receivers.

Figure 5:
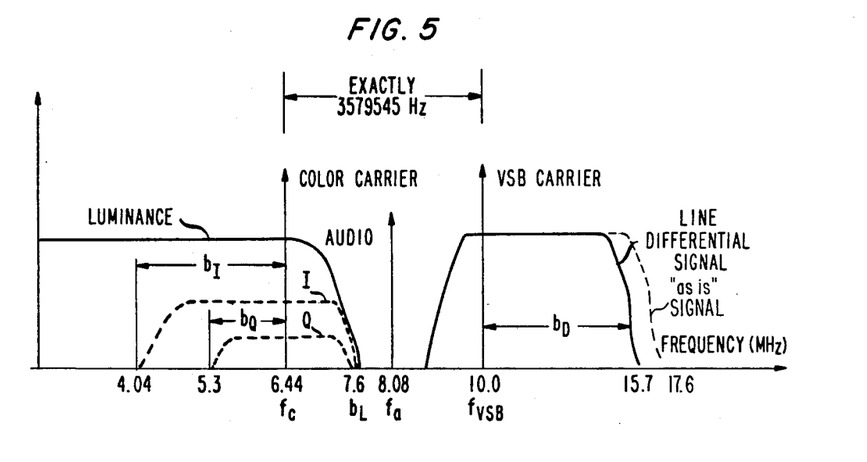
FIG. 5 is a baseband signal spectrum for a CHDTV color picture signal in accordance with the present invention wherein the line scan rate is the same as a NTSC system signal where, for simplicity, information from two lines is sent in one segment by stretching each HDTV composite line in time by a factor of two.

The most glaring incompatibility between proposed HDTV systems and the NTSC system is the line scan rate $F_H$ of the HDTV systems. Thus in accordance with the present invention, it is provided that for local distribution, a compatible HDTV signal (CHDTV) be transmitted which has the same line rate as NTSC, i.e., in the preferred embodiment $f_H = F_H/2$. In the preferred embodiment of the present invention, such transmission is accomplished by stretching each composite HDTV line signal in time by a factor of two and then sending the rate $f_H$ lines two at a time by a technique called Time-Frequency-Multiplexing. With this method one stretched scan-line would be transmitted as is, while the other would be sent as a line-differential signal in another frequency band on a vestigial sideband (VSB) carrier. FIG. 5 shows a baseband spectrum of this CHDTV signal where most of the frequencies are exactly one-half their counterparts in FIG. 2 due to the line stretching operation. This is, $b_L \triangleq 7.6$ MHz $f_c = (9/5) \times 3579545 \approx 6.44$ MHz $b_I = 2.4$ MHz $b_Q = 1.15$ MHz $f_H \triangleq (2/455) \times 3579545 \approx 15734$ Hz   (5)

The required bandwidth of the line differential signal will usually be no more than 75 percent of the luminance bandwidth, i.e., $b_D \approx 0.75 b_L \approx 5.7$ MHz   (6)

The VSB carrier frequency is chosen to be exactly 3579545 Hz above the color carrier, i.e., $f_{VSB} \triangleq f_c + 3579545 \triangleq (14/5) \times 3579545 \approx 10.0$ MHz   (7)

Likewise, the stereo audio FM carrier, which specifications are shown, for example, in the article "Multichannel Sound Systems for Television Broadcasting" by Y. Numaguchi et al in *IEEE Transactions of Consumer Electronics*, August 1981 at pp. 366-371, is placed 3579545 Hz above its nominal NTSC location of 4.5 MHz, i.e., $f_a \approx 4.5$ MHz $+ 3.579545$ MHz $\approx 8.08$ MHz   (8)

Figure 6:
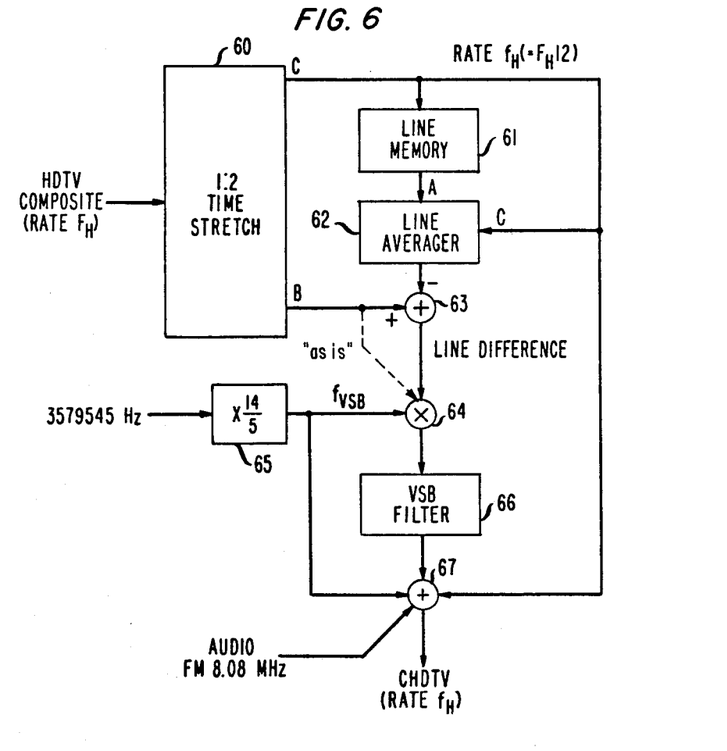
FIG. 6 is a block diagram of an arrangement for converting the HDTV composite signal generated in the arrangements of FIGS. 3 and 9 into the CHDTV color picture signal of FIGS. 5 and 10, respectively.

A preferred system for generating the (CHDTV) color picture signal from the HDTV composite color picture signal is shown in FIG. 6.

In FIG. 6, the input HDTV composite signal generated by, for example, the arrangement of FIG. 3 first passes through a 1:2 time stretching arrangement 60, which takes in the rate $F_H$ lines sequentially, two at a time and outputs rate $f_H$ ($=F_H/2$) lines in parallel, two at a time. The time stretching arrangement 60 could be implemented by any suitable arrangement of memory such as, for example, using digital memory, charge coupled devices (CCDs), surface acoustic wave (SAW) devices, etc. For purposes of illustration, suppose lines A, B and C occur sequentially in time in the HDTV composite signal being received, and that rate $f_H$ lines B and C are currently being outputted by 1:2 time stretching arrangement 60. The C line signal is received in a line memory 61, a line averager 62 and adder 67. Line memory 61 simply delays its input by exactly $f_H^{-1}$ seconds. Thus if the input to line memory 61 is the line C signal, then its output is the line A signal. Line averager 62 receives the output from line memory 61 and the line C signal and computes a linear or other combination of picture elements (pels) in lines A and C. The objective of this combination is to produce a signal at the output of line averager 62 which is as good an approximation as possible of the line B. Thus, in the averaging operation, color subcarrier phase is an important consideration.

The output from line averager 62 is then subtracted from line B in subtraction circuit 63 to form a line-difference signal corresponding to line B. The line-difference signal is then modulated by modulator 64 onto a carrier $f_{VSB}$ which carrier is obtained from the NTSC frequency 3579545 Hz by, for example, a $\times 14/5$ phase locked loop (PLL) 65. In addition, the PLL 65 output must change phase by 180 degrees at the end of every HDTV color picture line. It is to be understood that the frequency 3579545 Hz could be extracted from the incoming HDTV composite signal, but more likely it would come from the same highly stable studio generator 22 used to generate $F_c$ in FIG. 3.

The modulated line-difference signal from modulator 64 then passes to a vestigial sideband (VSB) filter 66 which removes most of the lower sideband, e.g., below 8.2 MHz, and some of the upper sideband, e.g., above 15.7 MHz. The VSB filter 66 could also contain a comb filter which might attenuate or remove altogether the chrominance components. Alternatively, such a comb filter could follow the line differencing subtractor 63.

Finally, as shown in FIG. 6, the baseband line C signal, the VSB line B difference signal, the audio and the VSB carrier are added together in adder 67 to form the CHDTV color picture signal which requires only slightly more bandwidth than the original HDTV composite color picture signal.

Figure 7:
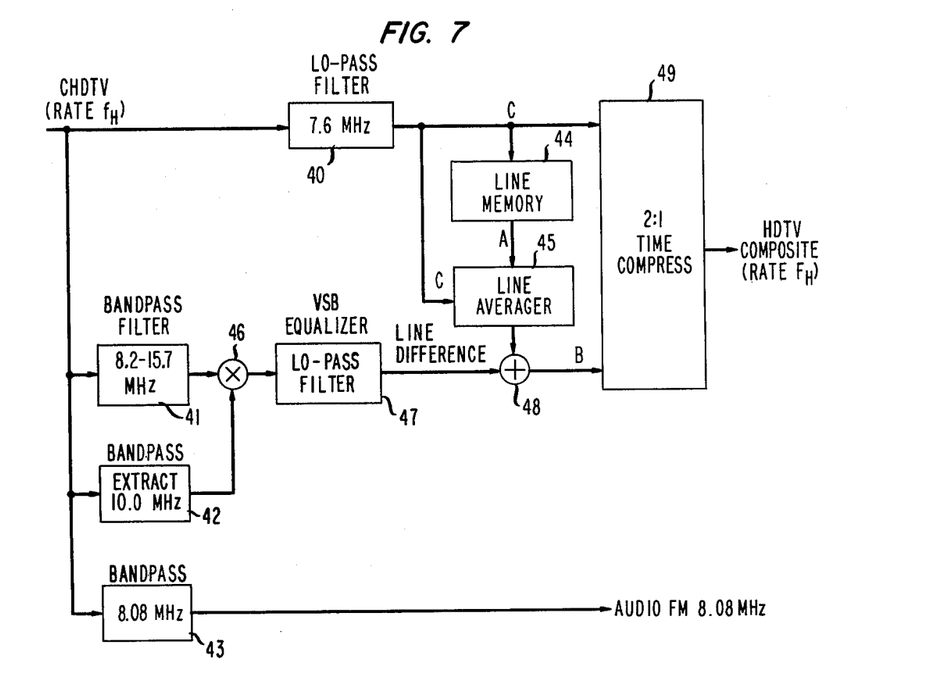
FIG. 7 is a block diagram of an arrangement for converting the CHDTV color picture signal formed by the arrangement of FIG. 6 back into the HDTV composite signal of FIG. 2.

FIG. 7 shows a system for regenerating the HDTV composite color picture signal from the CHDTV color picture signal for viewing on a HDTV receiver. The incoming CHDTV color picture signal is passed to four filters 40, 41, 42 and 43. The 7.6 MHz low-pass filter 40 functions to pick out the baseband, rate $f_H$ line C and passes it to a line memory 44 and a line averager 45 which perform the same function as their counterparts 61 and 62 in FIG. 6.

The 8.08 MHz bandpass filter 43 functions to pick out the FM audio signal. The 10.0 MHz bandpass filter 42 extracts the VSB carrier $f_{VSB}$. Alternatively, filter 42 could be a phase locked loop (PLL). If the VSB carrier were transmitted as a blanking period burst, then $f_{VSB}$ would be obtained by a gated phase locked oscillator (PLO).

The 8.2–15.7 MHz bandpass filter 41 passes the received modulated line-difference signal which is then demodulated by the multiplier (or mixer) 46 and equalizing low-pass filter 47 which doubles the amplitude of the single sideband (SSB) frequency components. Alternatively, this equalization could take place at the transmitter VSB filter 66 in FIG. 6 in order to improve overall system economies.

The line difference signal is then added by adder 48 to the output of the line averager 45 to recover the rate $f_H$ line B. Lines B and C then pass in parallel at the NTSC rate $f_H$ to a 2:1 time compressor 49 which takes in rate $f_H$ lines, two at a time in parallel and outputs rate $F_H(=2f_H)$ lines, two at a time sequentially. This operation finally produces the rate $F_H$ HDTV composite color picture signal of FIG. 2.

Figure 8:
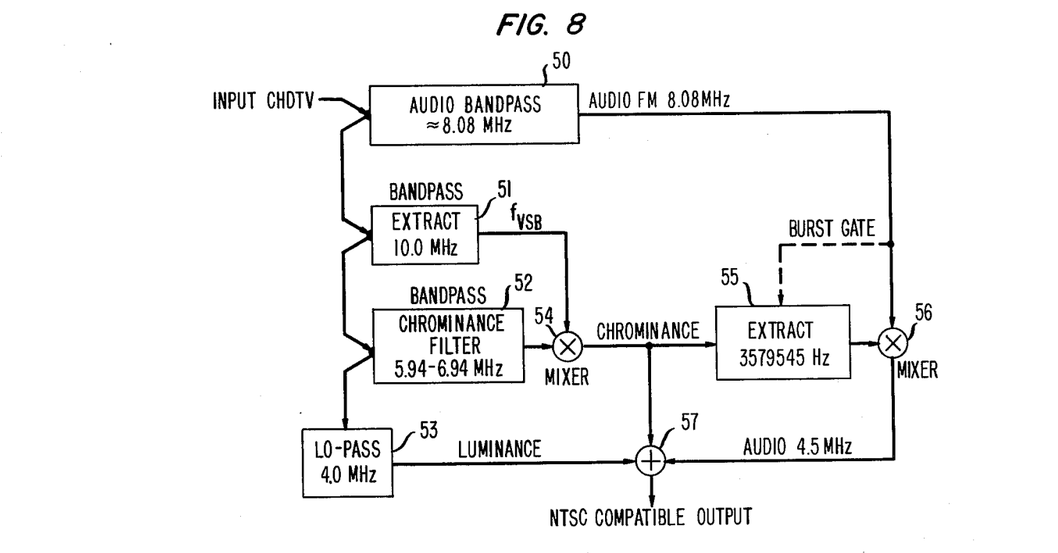
FIG. 8 is a block diagram of an arrangement for converting the CHDTV signal formed by the arrangement of FIG. 6 into an NTSC compatible signal.

A system for generating an NTSC compatible signal from the CHDTV color picture signal of FIG. 5 is shown in FIG. 8. The input CHDTV color picture signal passes to four system components. The first module is a bandpass filter 50 centered about 8.08 MHz which picks off the audio FM signal. Next is a bandpass filter 51 (possibly in combination with a phase-locked loop) which extracts the VSB carrier frequency $f_{VSB} \approx 10.0$ MHz.

Following this, the input signal passes to a chrominance bandpass filter module 52 which extracts the 1 MHz frequency band centered about the CHDTV color picture color carrier frequency $f_c \approx 6.44$ MHz. It should be noted that $f_c$ changes phase by 180 degrees at the end of every CHDTV color picture line. The bandwidth of filter 52 is a compromise in that NTSC allows a wider bandwidth for the I chrominance components than is extracted here. With much more complex signal processing, the full I bandwidth of 1.5 MHz could be achieved. However, only a few pictures would benefit from this additional I bandwidth. The frequency band 5.94–6.94 MHz contains both chrominance and luminancecomponents. For maximum picture resolution the luminance components (which occur at harmonics of the line rate $f_H$) should be removed by a comb filter. However, the effect on picture quality of not doing so should be small in most cases.

Following the chrominance bandpass filter 52, the input HDTV color picture signal passes to a 4.0 MHz low-pass luminance filter 53 which removes components outside the NTSC video band. Filter 53 could also contain an arrangement for luminance comb filtering in order to minimize cross-color effects by removing frequency components which occur above $\approx 2$ MHz and at odd multiples of half the line rate. If cross-color effects are deemed to be of less importance, then the comb filter may be deleted. However, if the bandwidth $B_I$ is chosen to be larger than the 4.8 MHz of equation (4), then a luminance comb filter in filter 53 is required in order to remove high frequency I components. Alternatively, the 4.0 MHz low-pass filter 53 might be replaced by a 4.5 MHz notch filter which removes frequency components at and near the NTSC audio carrier frequency.

The output of the chrominance bandpass filter 52 is mixed with $f_{VSB}$ by first mixer 54. If the CHDTV chrominance signals are not I and Q, a phase shift in $f_{VSB}$ may be necessary prior to mixing, in order to recover I and Q. Since $f_{VSB} - f_c$ was chosen to be exactly equal to the NTSC color subcarrier frequency 3579545 Hz, the output of first mixer 54 contains an NTSC compatible chrominance signal, with reduced I bandwidth, however. Moreover, since both $f_{VSB}$ and $f_c$ change phase by 180 degrees at the end of every CHDTV color picture line, the NTSC color carrier has constant phase. The resulting chrominance signal then passes to a module 55 which extracts the constant phase NTSC color carrier frequency 3579545 Hz. Implementation of extractor 55 can be done, for example, via a gated phase locked oscillator using the color burst as a reference. The burst gating signal could be obtained from the line synchronization of the CHDTV video signal. However, a much simpler implementation results if the burst gating signal is amplitude modulated onto the audio FM signal. The latter arrangement is shown by a dashed line in FIG. 8.

The audio FM signal is mixed with 3579545 Hz by a second mixer 56. This creates an audio component at $\approx 4.5$ MHz which is NTSC compatible. Finally, the luminance, chrominance and audio signals are added together in adder 57 to give an NTSC compatible output. This output signal could be low-pass filtered to remove unneeded components above 4.5 MHz. However, in many applications this may not be necessary.

The present approach to using a high definition TV signal can also be applied to other than 525-line NTSC color TV signals. For example, with 625 line systems, HDTV composite signals very similar to that of FIG. 2 can be defined using different carrier frequencies and bandwidths. The same is true of the CHDTV color picture signal of FIG. 5. The only basic requirement is that $f_{VSB} - f_c$ be exactly equal to the present-day color subcarrier frequency of the associated conventional system for which compatibility is desired, and that the phase of $f_{VSB}$ be controlled to give the desired color subcarrier phase. With Phase Alternation Line (PAL), the line averagers 62 and 45 of FIGS. 6 and 7, respectively, would have to be time varying in order to accommodate the phase changes in the PAL color subcarrier. With SECAM, the French developed system, suitable line averaging may not be possible, and a full bandwidth video signal might have to be transmitted on the VSB carrier of the CHDTV color picture signal comparable to the dashed line in FIG. 5 for an "as is" signal in an NTSC compatible version.

Figure 9:
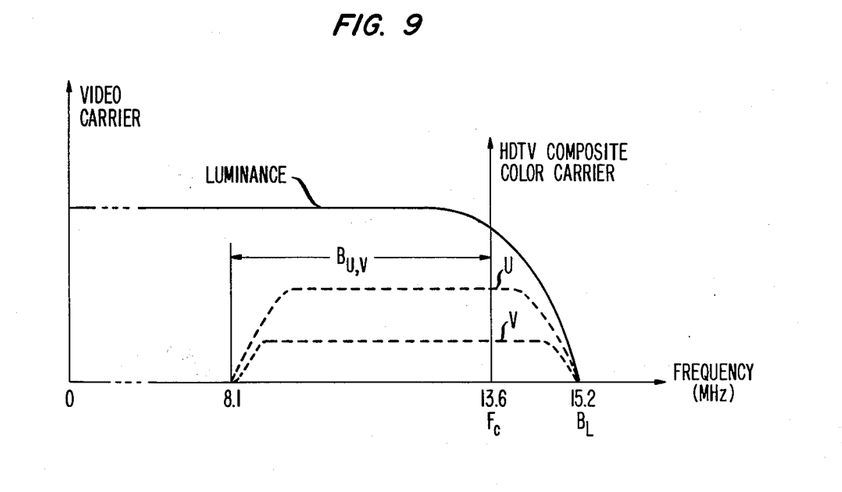
FIG. 9 is a baseband signal spectrum for a Phase Alternation Line (PAL) type HDTV composite signal similar to that shown in FIG. 2 for the NTSC type HDTV composite signal.

A particularly intriguing possibility would be to define a PAL-type HDTV composite signal which is usable with today's U.S. standard 525-line NTSC. Phase errors due to transmission would then presumably be much less serious in the reproduced HDTV pictures. The PAL-type HDTV composite color subcarrier frequency $F_c$ must be chosen as an integer multiple $\pm \frac{1}{4}$ of the line scan rate, and the two chrominance components U and V must be transmitted with equal bandwidth. For example, the spectrum of a PAL-type HDTV composite signal is shown in FIG. 9 with the following parameters:

$$F_H = (4/455) \times 3579545 \approx 31468 \text{ Hz}$$

$$F_c = 432\tfrac{1}{4} \times F_H \approx 13.6 \text{ MHz}$$

$$B_L = 15.2 \text{ MHz}$$

$$B_U = B_V \approx 5.4 \text{ MHz.} \tag{9}$$

Note that the chrominance signals enjoy more bandwidth than with the NTSC-type HDTV composite signal of FIG. 2. However, chrominance recovery at the receiver is somewhat more difficult.

Figure 10:
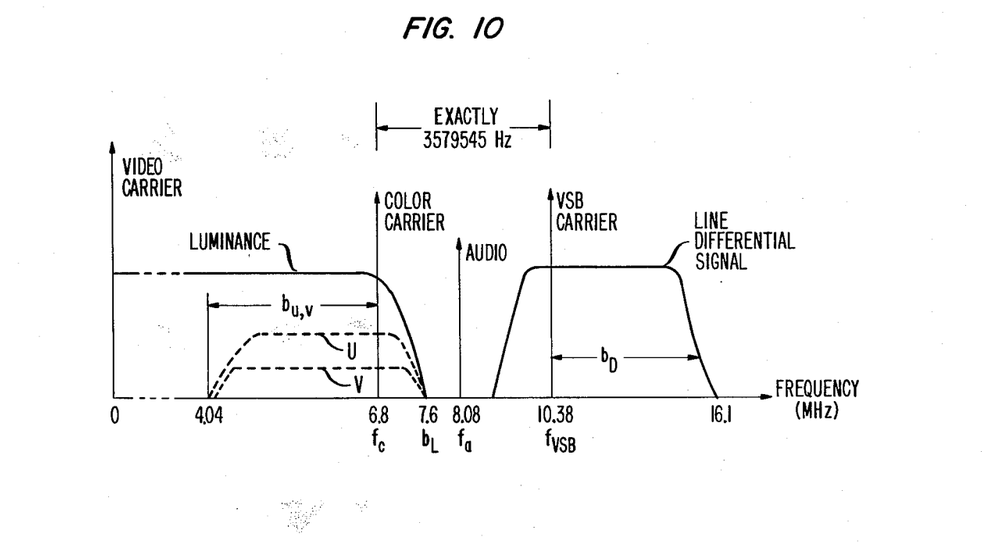
FIG. 10 is a baseband signal spectrum for a PAL-type CHDTV color picture signal formed from the HDTV composite signal of FIG. 9.

The numerical values of equation (9) lead to the PAL-type CHDTV color picture signal shown in FIG. 10 with the following parameters:

$$f_H = (2/455) \times 3579545 \approx 15734 \text{ Hz}$$

$$f_c = (19/10) \times 3579545 \approx 6.8 \text{ MHz}$$

$$f_{VSB} = (29/10) \times 3579545 \approx 10.38 \text{ MHz}$$

$$b_L = 7.6 \text{ MHz}$$

$$b_U = b_V \approx 2.7 \text{ MHz}. \qquad (10)$$

Other parameters are the same as in FIG. 5 and equations (5)–(8).

Generation of the PAL-type CHDTV color picture signal is very similar to that described hereinbefore for NTSC-type HDTV color picture signal, except for the following:

(1) Conversion between RGB signals and the HDTV composite signal must obviously employ PAL techniques instead of the NTSC techniques shown in FIG. 3.

(2) The line averagers 62 and 45 of FIGS. 6 and 7, respectively, used in the production and utilization of the line difference must be time varying in order to accommodate the color subcarrier phase shifts which occur at the end of each scan line.

(3) The phase of $f_{VSB}$ in FIG. 6 must be controlled in a slightly different way in order to produce a constant phase NTSC color carrier.

(4) In FIG. 8, a phase shift must be introduced between the NTSC chrominance and the NTSC color burst in order to convert the U,V chrominance signals to I,Q as required by NTSC. This operation could also and possibly more economically be carried out by a further control of the phase of $f_{VSB}$.

Although the operations are described hereinbefore at baseband, they could just as well and maybe better be performed at IF, especially where line delays, time companders and filters are concerned. For local cable distribution the CHDTV color picture signal would presumably be transmitted by VSB amplitude modulation on an RF carrier. Required bandwidth would be around 17 MHz, i.e., the RF signal would occupy three standard NTSC channels. For direct broadcast satellite (DBS) distribution the HDTV color picture signal would be transmitted by frequency modulation (FM) on an RF carrier. Required bandwidth would be upwards of 40–50 MHz, and possibly much more depending on the downlink power budget, i.e., radiated power, satellite and ground station antenna gains, receiver noise temperature, interference, etc.

In principle, it is not absolutely necessary to generate and transmit line differential signals as described hereinbefore. The rate $f_H$ TV line (line B in FIG. 6) which is sent as a difference signal could instead be sent intact as VSB on the carrier $f_{VSB}$ by directly applying the line B signal in FIG. 6 to modulator 64 and eliminating elements 61–63. However, the bandwidth required by the HDTV color picture signal would then be about 2 MHz larger, and for cable distribution systems the signal would occupy four standard NTSC channels. For direct broadcast satellite (DBS) transmission via FM, the VSB signal would not only be of larger bandwidth, it would also be of higher power than with a line-difference signal. Thus, FM would require additional deviation and, therefore, additional bandwidth. Finally, unless a line-difference signal is used on the VSB carrier the benefits of companding cannot be realized, and for a given DBS downlink power budget the received SNR will be lower.

Figure 11:
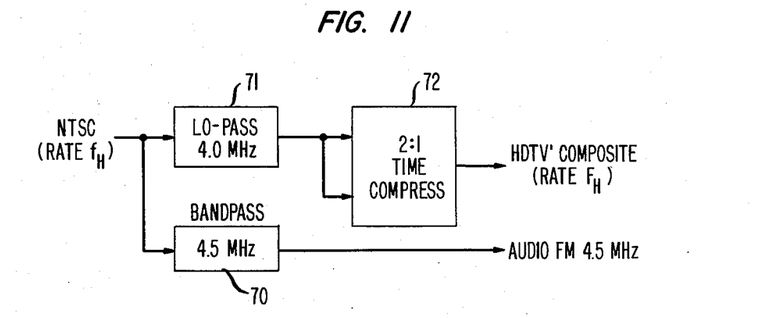
FIG. 11 is a block diagram of a system implementing the first step for displaying NTSC signals on HDTV receivers where the NTSC signal is time compressed and repeated to obtain a quasi high-definition composite waveform HDTV'.

It is important that HDTV receivers be able to also accept standard present-day NTSC color TV signals and produce from them reasonably good, albeit not high definition, pictures. A procedure and system for doing so is accomplished in two steps, the first of which is shown in FIG. 11. The NTSC signal of FIG. 1 is split by two filters 70 and 71 into audio and video sections, respectively, after which the video signal has its line scan rate doubled (to $F_H$) by means of a 2:1 time compression and line repeating unit 72. The 2:1 time compressor 72 is identical to the time compressor 49 of FIG. 7, and indeed in a practical system a single compressor could serve both functions. Also, the low-pass filter 71 might be replaced by a bandstop filter centered at 4.5 MHz.

The output composite video signal HDTV' in FIG. 11 differs from the previously defined HDTV composite signal of FIG. 2 in that the bandwidth is much reduced, and the color subcarrier frequency $$F_c' \triangleq (455/2) F_H \approx 7.16 \text{ MHz} \qquad (11)$$

is much lower. Also, the color subcarrier of the HDTV' composite signal is not a pure sinusoid, but instead undergoes a 180 degree phase shift every two lines.

The bandwidths of the Y', I' and Q' signals are exactly doubled in the HDTV' composite signal as compared with the NTSC signal, i.e., $$B_L' \approx 8.4 \text{ MHz}$$

$$B_I' \approx 3.0 \text{ MHz}$$

$$B_Q' \approx 1.0 \text{ MHz} \qquad (12)$$

Figure 12:
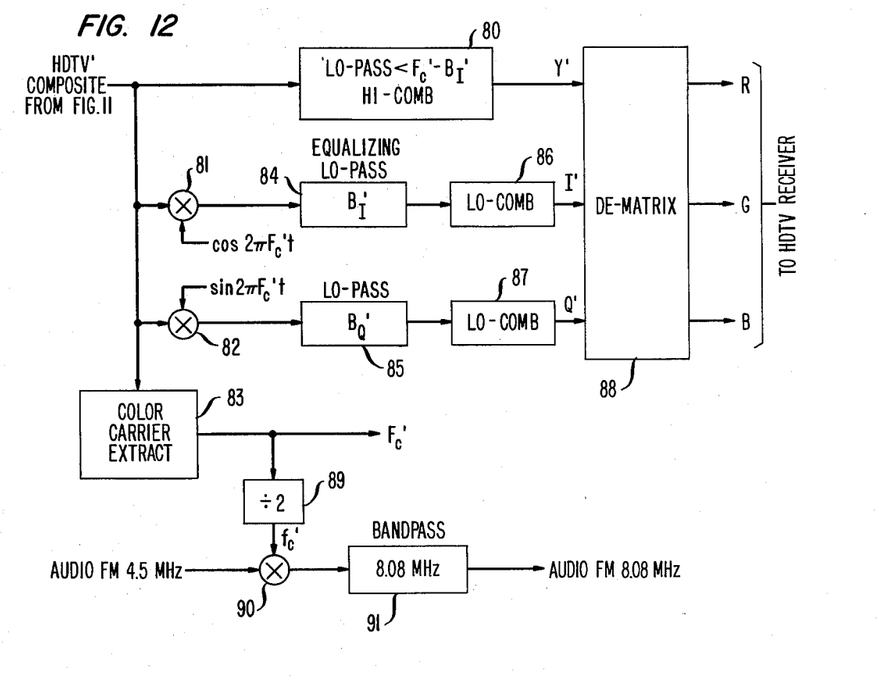
FIG. 12 is a block diagram of a system implementing the second step for displaying NTSC signals on HDTV receivers where the HDTV' composite waveform of FIG. 11 is transformed into R, G, and B components.

FIG. 12 shows the second step of the conversion where the HDTV' composite signal from FIG. 11 is converted to R, G, B signals and the audio signal is moved up to 8.08 MHz so that it agrees with the audio signal of FIG. 5. The arrangement of FIG. 12 is very similar to that of FIG. 4.

The luminance Y' is obtained by low-pass, hi-comb filtering the HDTV' composite signal in filter 80. The switch-over frequency is approximately $$F_c' - B_I' \approx 4.16 \text{ MHz}. \qquad (13)$$

The lumiance comb filtering should attenuate the chrominance components as much as possible. However, because of the line repeating, the frequency interleaving of NTSC is not maintained, and simple comb filtering is not completely effective. One possibility would be for the comb filter to average only alternate lines of the HDTV' composite signal. Another would be to use a time varying filtering operation.

The color carrier extraction circuit 83 derives $F_c'$ from the color burst of each line. This operation must be independent from line to line because of the occasional 180 degree phase shift in the color subcarrier. The two mixers 81 and 82 perform the quadrature demodulation of the I' and Q' signals after which low-pass and comb filtering are carried out in filters 84–87 as described for filters 33, 34, 36, 37 of FIG. 4. As with the Y' comb filter 80, better performance may be obtained if the I' and Q' comb filters 86 and 87 average only alternate lines of the signal. Also, as before for FIG. 4, the two comb filters 86 and 87 may be replaced by a single bandpass comb filtering operation prior to mixing and carrier extraction.

The dematrixing operation which converts Y', I' and Q' signals to R, G, B signals is performed by dematrix unit 88 which is similar to that of dematrix unit 38 of FIG. 4.

The ÷2 circuit 89 derives the NTSC color carrier frequency $$f_c' = 3579545 \text{ Hz} \tag{14}$$

from the HDTV' color carrier frequency $F_c^{40}$. Because of the phase discontinuities, a simple ÷2 circuit may not work very well. Instead a ×2 circuit followed by a ÷4 circuit may be more suitable in order to obtain a constant phase, or $f_c'$ could be extracted from the NTSC signal of FIG. 11. In any event, the frequency $f_c'$ is mixed in mixer 90 with the NTSC audio and filtered in filter 91 to obtained the HDTV audio centered at 8.08 MHz.

It is to be understood that the five HDTV filters of FIG. 4 could also be used in the corresponding filters of FIG. 12 to decode the HDTV' composite signal. However, picture quality will not be up to NTSC potential. In the first place, no comb filtering would be done on the luminance signal. Thus, the color subcarrier pattern would be quite visible causing the familiar serrations and crawling of colored edges. A compromise might be to extend the luminance comb filtering of the FIG. 4 arrangement at least down to the HDTV' composite color carrier frequency $F_c'$.

A more serious problem of using the HDTV filters of FIG. 4 directly is that of I' signal crosstalk into the Q' signal. This will occur over the frequency band 1.0–2.3 MHz and will cause some erroneous colors at sharp edges. Many alternatives exist in the design of NTSC receiver circuitry. For example, in FIG. 11, extracting the chrominance information prior to time compression and moving it from a carrier frequency $f_c'$ to the carrier frequency $f_c$ can be considered. Alternatively, one could produce NTSC, rate $f_H$, R, G, B signals and use three 2:1 time compressors to produce rate $F_H$, R, G, B signals. Any design will require a trade-off between economics and picture quality.

It is to be understood that the above-described embodiments are simply illustrative of the principles of the invention. Various other modifications and changes may be made by those skilled in the art which will embody the principles of the invention and fall within the spirit and scope thereof. For example, instead of generating a HDTV composite color picture signal with twice the number of lines of an associated conventional television system color picture, such picture may be formed with some other multiple as, for example, three times the number of picture lines and three times the line scan rate of the associated conventional television system. For a picture with, for example, 1575 lines (3 times the NTSC picture), FIGS. 2–8 and 11 and 12 would be modified to, for example, place a third line signal as, for example, a line differential signal on a separate vestigial sideband carrier similar to the method for providing the second line signal as a line differential signal on a first vestigial sideband in FIG. 5. Also, the line approximation or prediction signal formed by averagers 45 and 62 could be formed from linear or other combinations of additional lines either in the same field or in previous fields. In this case additional memory would be required in memories 44 and 61 in order to make available said additional lines.

What is claimed is:

1. An arrangement for generating a compatible high-definition television (CHDTV) color picture signal including a predetermined bandwidth and format, the arrangement comprising:

means, responsive to a HDTV composite color picture signal as generated by HDTV camera color tubes at a first line scan rate, for stretching each of at least a first and a second sequential line signal of the HDTV composite color picture signal in time by a factor which is a predetermined submultiple of the first line scan rate to generate respective line signals which are at the same line scan rate as that of an associated conventional television system picture signal;

means, responsive to the at least first and second time stretched line signals from the time stretching means, for transmitting the first stretched line signal as is in a first portion of the predetermined bandwidth of the CHDTV color picture signal and, concurrent therewith, for transmitting the second stretched line signal either one of as is or as a line differential signal in a second portion of the predetermined bandwidth of the CHDTV color picture signal on a vestigial sideband carrier signal which is separated from a color subcarrier of the first line signal by a frequency which is substantially equal to that of a baseband color subcarrier frequency of the associated conventional television system color picture signal.

2. An arrangement for generating a CHDTV color picture signal according to claim 1 wherein the transmitting means is further capable of transmitting an audio signal associated with the CHDTV color picture signal in a frequency band which is associated with an audio subcarrier comprising a frequency substantially equal to the addition of an audio subcarrier frequency and a color subcarrier frequency of the associated conventional television system color picture signal format.

3. An arragement for generating a compatible high-definition, television (CHDTV) color picture signal according to claim 1 wherein the arrangement further comprises:

means capable of being responsive to color signals associated with the HDTV camera color tubes for generating a HDTV composite picture signal to the time stretching means comprising a frequency scaled up version of the associated conventional system color picture signal including a lumiance bandwidth capable of providing a number of picture line signals at the first line scan rate which is a predetermined multiple of the line scan rate of the associated conventional television system color picture signal, a frame and field rate which is the same as that of said associated conventional television system color picture signal, and chrominance information comprising first and second chroma components which are formed on sidebands of a separate color subcarrier within said luminance bandwidth which is a fixed multiple of the line scan rate of the associated conventional television system color picture signal and includes a ratio of each of the chroma component bandwidths to the luminance bandwidth which is similar to that of the associated conventional television system color picture signal.

4. An arrangement for generating a CHDTV color picture signal according to claim 3 wherein the means capable of generating a HDTV composite picture signal comprises:
  means capable of converting the color signals (R,G,B) from the HDTV camera color tubes into appropriate luminance (Y) and first and second chromiance (I,Q) signal components; and
  means responsive to the luminance and chrominance signal components from the converting means for modulating each of the first and second chrominance components into appropriate sideband signals of a predetermined color subcarrier frequency, which modulated first and second chrominance signal components are added to the luminance signal for producing the HDTV composite picture signal.

5. An arrangement for generating a CHDTV color picture signal according to claim 3 or 4 wherein
  the time stretching means is capable of receiving the at least first and second line signal of the HDTV composite signal in sequence and generating as an output at least a first and a second line signal in parallel on separate paths at the second line scan rate of the CHDTV color picture signal; and
  the transmitting means comprises:
    means responsive to the output from said time stretching means for generating a line differential signal which is the difference between said second time stretched line signal and an approximation or prediction of said second time stretched line signal which is generated from a linear or other combination of the first and a third time stretched line signal, said first and third time stretched line signals being generated by the time stretching means from line signals occurring just before and after the second line signal in the HDTV composite signal; and
    means for modulating the line differential signal onto a vestigial sideband carrier signal and adding the resultant vestigial sideband signal to the first time stretched line signal from said time stretching means for providing the CHDTV color picture signal.

6. A receiver for converting a compatible high-definition television (CHDTV) color picture signal into a HDTV composite color picture signal capable of use by a HDTV receiver, the CHDTV color picture signal comprising a predetermined bandwidth, a line scan rate which is the same as an associated conventional television color picture signal, a first line signal which is sent as is and containing a first color subcarrier frequency in a first portion of the predetermined bandwidth of the CHDTV color picture signal, and a second line signal which is sent concurrent with the first line signal in a second portion of the predetermined bandwidth of the CHDTV color picture signal either one of as is or as a line differential signal on a vestigial sideband carrier frequency which is separated from the first color subcarrier frequency by a frequency equal to that of a baseband color subcarrier frequency of the associated conventional television system color picture signal, the receiver comprising:
  means for receiving the CHDTV color picture signal and separating the first CHDTV color picture line signal and the second CHDTV color picture line signal on the vestigial sideband carrier for transmission over separate paths;
  means capable of transforming the second line signal received via the vestigial sideband carrier into a recovered second CHDTV color picture line signal within a frequency band of the received first CHDTV color picture line signal; and
  time compression means capable of receiving the first CHDTV color picture line signal and the recovered second CHDTV color picture line signal in parallel at the CHDTV color picture line scan rate and generating as an output a first and a second HDTV composite color picture line signal in sequence at a line scan rate which is a predetermined multiple of the CHDTV color picture signal line scan rate.

7. A receiver according to claim 6 wherein the transforming means comprises:
  demodulating means capable of demodulating the vestigial sideband line differential signal with the vestigial sideband carrier frequency to generate a line differential signal in the frequency band of the first CHDTV color picture line signal;
  means capable of generating an approximation of the second CHDTV color picture line signal from both the first CHDTV color picture line signal from the separation means and a stored previous value of a first CHDTV color picture line signal received in the receiver in an immediately prior HDTV color picture signal; and
  adding means responsive to the line differential signal from the demodulation means and the approximation of the second CHDTV color picture line signal from the generating means for providing a recovered second HDTV color picture line output signal.

8. A receiver for converting a compatible high-definition television (CHDTV) color picture signal into an associated conventional television system color picture signal, the CHDTV color picture signal comprising a predetermined bandwidth, a line scan rate which is the same as that of the associated conventional television color picture signal, a first line signal which is sent as is and containing a first color subcarrier frequency in a first portion of the predetermined bandwidth of the CHDTV color picture signal, and a second line signal which is sent concurrent with the first line signal in a second portion of the predetermined bandwidth of the CHDTV color picture signal either one of as is or as a line differential signal on a vestigial sideband carrier frequency which is separated from the first color subcarrier frequency by a frequency equal to that of a baseband color subcarrier frequency of the associated conventional television system color picture signal, the receiver comprising:
  filtering means for passing only a frequency band within the first portion of the predetermined bandwidth of the CHDTV picture signal including a bandwidth substantially corresponding to a luminance bandwidth of the associated conventional color picture signal format; and
  modulating means for modulating chrominance information signals associated with only the first line signal of the CHDTV color picture signal with the vestigial sideband carrier frequency to produce appropriate chrominance information signals within the luminance bandwidth of the associated conventional system color picture signal.

9. A receiver according to claim 8 wherein the modulating means comprises:

means capable of passing therethrough only a predetermined frequency band centered on the first color subcarrier frequency which is no wider than a chrominance bandwidth in the associated conventional system color picture signal while rejecting all other frequencies within the CHDTV color picture signal; and a modulator capable of modulating the resultant signal from the frequency band passing means and the vestigial sideband carrier frequency to produce the appropriate chrominance information signals within the luminance bandwidth of the associated conventional system color picture signal.

10. An arrangement for generating a high definition television (HDTV) composite color picture signal capable of use by a HDTV receiver, the arrangement comprising:

means responsive to color signals (R,G,B) from a HDTV camera color tubes for converting the camera color tube signals into appropriate luminance (Y) and first and second chrominance (I, Q) signal components; and means responsive to the luminance and chrominance signal components from the converting means for generating the HDTV composite color picture signal comprising a frequency scaled up version of an associated conventional system color picture signal including a luminance bandwidth capable of providing a number of picture line signals and a line scan rate which is a predetermined multiple of the line scan rate of the associated conventional system color picture signal, a frame and a field rate which is the same as that of the associated conventional system color picture signal, and chrominance information comprising first and second chroma components which are formed on sidebands of a separate color subcarrier within the luminance bandwidth which is a fixed multiple of the line scan rate of the associated conventional system color picture signal and includes a ratio of each of the chroma component bandwidths to the luminance bandwidth which is similar to that of the associated conventional system color picture signal.

11. An arrangement for converting a conventional television system color picture signal including sequential line signals at a first line scan rate and audio signals disposed on a sound carrier above the line signals into a High Definition Television (HDTV) composite color picture signal for subsequent viewing on a HDTV receiver, the arrangement comprising:

means for separating the sequential line signals and the audio signals of the conventional television system color picture signal for propagation along separate paths to the HDTV receiver; and means capable of converting each line signal of the conventional system color picture signal into at least two sequential line signals at the output thereof including a second line scan rate which is a predetermined multiple of the first line scan rate corresponding to the actual number of said at least two sequential lines, and luminance and chrominance component bandwidths which are the predetermined multiple of corresponding bandwidths of the conventional system color picture signal for producing the HDTV composite color picture signal.

12. An arrangement according to claim 10 or 11 wherein the arrangement further comprises:

means capable of transforming the HDTV composite color picture signal into color signals (R, G, B) for use with a HDTV receiver, the transforming means comprising:

filtering means for passing therethrough only luminance signals of the HDTV composite picture signal;

first modulating means for modulating a first quadrature component of a color subcarrier frequency of the HDTV composite picture signal with the HDTV composite picture signal to produce a first chroma component signal;

second modulating means for modulating a second quadrature component of the color subcarrier frequency of the HDTV composite picture signal with the HDTV composite picture signal to produce a second chroma component signal; and dematrixing means capable of converting the luminance and first and second chroma components into appropriate predetermined color signals for use by a HDTV receiver to produce a picture.

13. A method of generating a compatible high-definition television (CHDTV) color picture signal including a predetermined bandwidth and format, the method comprising the steps of:

(a) generating from color signals associated with line signals of a picture as generated by HDTV camera color tubes at a first line scan rate, a CHDTV color picture signal which includes line signals at a second line rate that is both a submultiple of the first line scan rate and the same line scan rate as that of an associated conventional television system color picture signal by sending information associated with at least two lines from the camera color tubes in one signal segment by performing the steps of:

(a1) stretching each of the at least two lines in time by a factor which is the inverse of said submultiple of the first line scan rate;

(a2) forming a first line signal of said at least two time stretched lines as is for transmission within a first portion of the predetermined bandwidth of the CHDTV color picture signal; and (a3) concurrent with step (a2), forming a second line signal of said at least two time stretched lines as a line differential signal for transmission in a second portion of the predetermined bandwidth of the CHDTV color picture signal on a vestigial sideband carrier signal which is separated from a color subcarrer of the first line signal by a frequency which is substantially equal to that of a baseband color subcarrier frequency of the associated conventional television system color picture signal.

14. The method of generating a CHDTV color picture signal according to claim 13 wherein the method comprises the further step of:

(b) transmitting an audio signal associated with the CHDTV color picture signal in a frequency band which is associated with an audio subcarrier which has a frequency substantially equal to the addition of an audio subcarrier frequency and a color subcarrier frequency of the associated conventional television system color picture signal format.

15. A method of generating a compatible high-definition television (CHDTV) color picture signal capable of being converted into either one of a high-definition televeision (HDTV) composite color picture signal or an associated conventional television system color picture signal, the method comprising the steps of:
(a) generating from color signals from a HDTV camera a HDTV composite picture signal comprising a frequency scaled up version of the associated conventional television system color picture signal including a luminance bandwidth capable of providing a number of picture lines and a line scan rate which is a predetermined multiple of the number of picture lines and line scan rate, respectively, of the associated conventional television system color picture signal, a frame and a field rate which is the same as that of said associated conventional television system color picture signal, and chrominance information including first and second chroma components which are formed on sidebands of a separate color subcarrier within said luminance bandwidth which is a fixed multiple of the line scan rate of the associated conventional television system color picture signal and includes a ratio of each of the chroma component bandwidths to the luminance bandwidth which is similar to that of the associated conventional television system color picture signal; and
(b) transforming the HDTV composite color picture signal into a CHDTV color picture signal including a line scan rate which is the same as the associated conventional television system color picture signal format by sending information associated with at least two lines of the HDTV composite picture signal in one signal segment by stretching each HDTV composite line signal in time by a factor corresponding to said predetermined multiple and forming a first line signal as is within a first portion of a predetermined bandwidth of the CHDTV color picture signal which is both within, and a predetermined submultiple of, the luminance bandwidth of the HDTV composite picture signal and a second line signal which is formed as a line-differential signal in a second portion of the predetermined bandwidth of the CHDTV color picture signal on a vestigial sideband carrier signal which is separated from the color subcarrier of the first line signal by a frequency equal to that of a baseband color subcarrier frequency of the associated conventional system color picture signal.

16. A method of generating a CHDTV color picture signal according to claim 15 wherein the method comprises the further steps of:
(c) in performing step (b), performing the steps of:
(c1) receiving at least a first and a second line signal of the HDTV composite signal in sequence and generating as an output at least a first and a second line signal in parallel on separate paths at the second line scan rate;
(c2) generating a line differential signal of said second line signal in parallel which is the difference between the second line signal in parallel and an approximation of the second line signal in parallel which is generated from a linear or other combination of the first and a third line signal occurring just before and after the second line signal in the HDTV composite signal;
(c3) modulating the line differential signal onto a vestigial sideband carrier signal; and (c4) adding the resultant vestigial sideband signal to the first line signal in parallel generated in step (c1) to provide the CHDTV color picture signal.

17. A method of converting a compatible high-definition television (CHDTV) color picture signal into a HDTV composite color picture signal for use by a HDTV receiver, the CHDTV color picture signal including a predetermined bandwidth wherein a first line signal of at least two line signals is received as is in one portion of the bandwidth at a first line scan rate and a second line signal of the at least two line signals is received as a line differential signal in a second portion of the bandwidth at the first line scan rate which is the same as the line scan rate of a conventional television system color picture signal, the method comprising the steps of:
(a) separating the first and the second line signals of the received CHDTV color picture signal for transmission over a first and a second path, respectively;
(b) demodulating the second line signal to provide a line differential signal within the bandwidth of the received first line signal;
(c) generating an approximation of the second line signal from two sequential received first line signals;
(d) generating a recovered second line signal from the resultant signals of steps (b) and (c); and
(e) time compressing the first and the second line signals froms steps (a) and (d) received in parallel at the first line scan rate into a first and a second line signal in sequence at a second line scan rate which is a predetermined multiple of the first line scan rate to produce the HDTV composite color picture signal.

18. A method of converting a compatible high-definition television (CHDTV) color picture signal into an associated conventional television system color picture signal for use by a conventional system television receiver, the CHDTV color picture signal including a predetermined bandwidth wherein a first line signal of at least two line signals containing a first color subcarrier frequency is received as is in a first portion of the bandwidth at a first line scan rate which is the same as the line scan rate of the associated conventional television system color picture signal and a second line signal of the at least two line signals is received on a vestigial sideband carrier frequency as a line differential signal in a second portion of the bandwidth at the first line scan rate and the first color subcarrier frequency and the vestigial sideband carrier frequency are separated by a frequency equal to a color subcarrier frequency of the associated conventional television color picture signal, the method comprising the steps of:
(a) filtering the received CHDTV color picture signal to pass only a frequency band within the first portion of the bandwidth of the CHDTV color picture signal substantially corresponding to a luminance bandwidth of the associated conventional color picture signal and comprises only a luminance signal of the first line signal; and
(b) demodulating chrominance information signals associated with only the first line signal of the CHDTV color picture signal with the vestigial sideband carrier frequency to produce appropriate chrominance information signals within the luminance bandwidth of the associated conventional television system color picture signal.

* * * * *